United States Patent [19]

Haygood et al.

[11] 4,205,325

[45] May 27, 1980

[54] KEYLESS ENTRY SYSTEM

[75] Inventors: Juan C. Haygood, Detroit; Ted L. Harman, Dearborn, both of Mich.

[73] Assignee: Ford Motor Company, Dearborn, Mich.

[21] Appl. No.: 865,033

[22] Filed: Dec. 27, 1977

[51] Int. Cl.[2] .................... H04Q 3/02; E05B 47/02; H02G 3/00

[52] U.S. Cl. .................... 340/147 MD; 340/63; 361/172; 307/10 R

[58] Field of Search .................... 180/111, 112, 113, 114; 307/10 AT, 10 R; 361/172; 340/147 MD, 164, 149 R, 147 R

[56] References Cited

U.S. PATENT DOCUMENTS

| | | | |
|---|---|---|---|
| 2,544,330 | 3/1961 | Koenig, Jr. | 340/164 A |
| 3,544,804 | 12/1970 | Gaumer | 307/10 AT |
| 3,659,154 | 4/1972 | Finn | 340/147 R |
| 3,660,729 | 5/1972 | James et al. | 361/172 |
| 3,691,396 | 9/1972 | Hinrichs | 307/10 AT |
| 3,754,213 | 8/1973 | Morroni | 340/147 MD |
| 3,766,522 | 10/1973 | Marsh | 361/172 |
| 3,788,422 | 1/1974 | Bowler | 180/114 |
| 3,796,889 | 3/1974 | Fradkin | 361/172 |
| 3,821,704 | 6/1974 | Sabsay | 340/149 R |
| 3,864,578 | 2/1975 | Lackey | 307/10 R |
| 3,969,596 | 7/1976 | Siegel | 307/10 AT |
| 4,055,772 | 10/1977 | Leung | 307/10 R |
| 4,062,056 | 12/1977 | Goodrich | 361/172 |

*Primary Examiner*—Donald J. Yusko
*Attorney, Agent, or Firm*—Paul K. Godwin, Jr.; Clifford L. Sadler

[57] ABSTRACT

A keyless entry system for an automotive vehicle permits a plurality of operations to be achieved from outside the vehicle by one who is knowledgeable of predetermined digital codes. Functions such as unlocking the doors of the vehicle, opening the rear deck lid, opening a roof window, lowering the windows or programming the system with a user preferred digital access code are all performed by proper sequential operation of a digital keyboard mounted on the outside of the vehicle.

20 Claims, 11 Drawing Figures

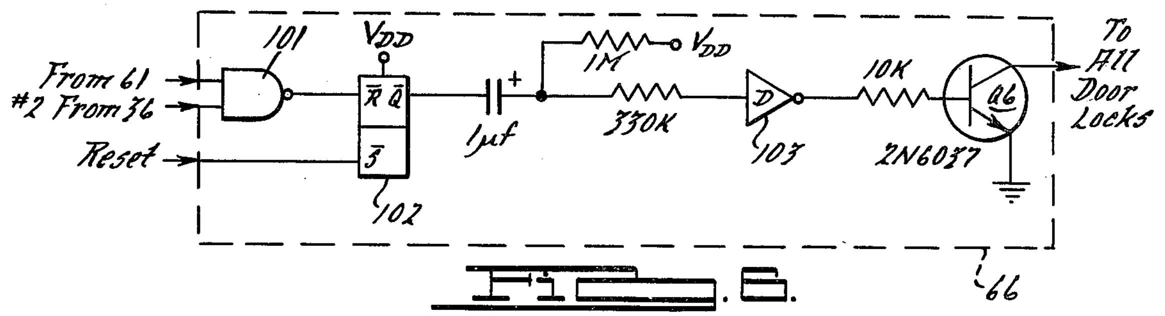
FIG. 6.
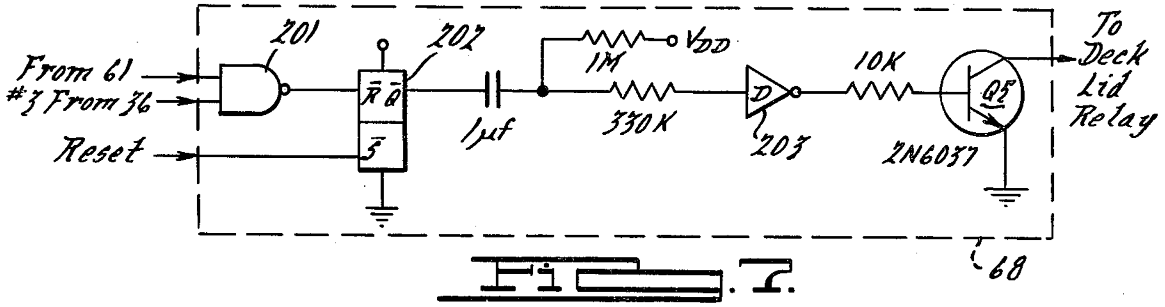
FIG. 7.
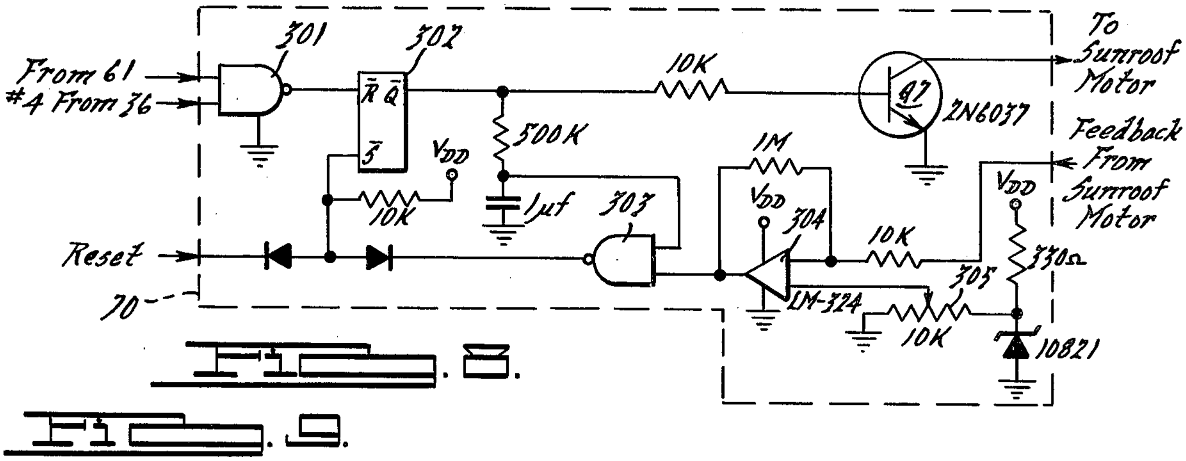
FIG. 8.
FIG. 9.
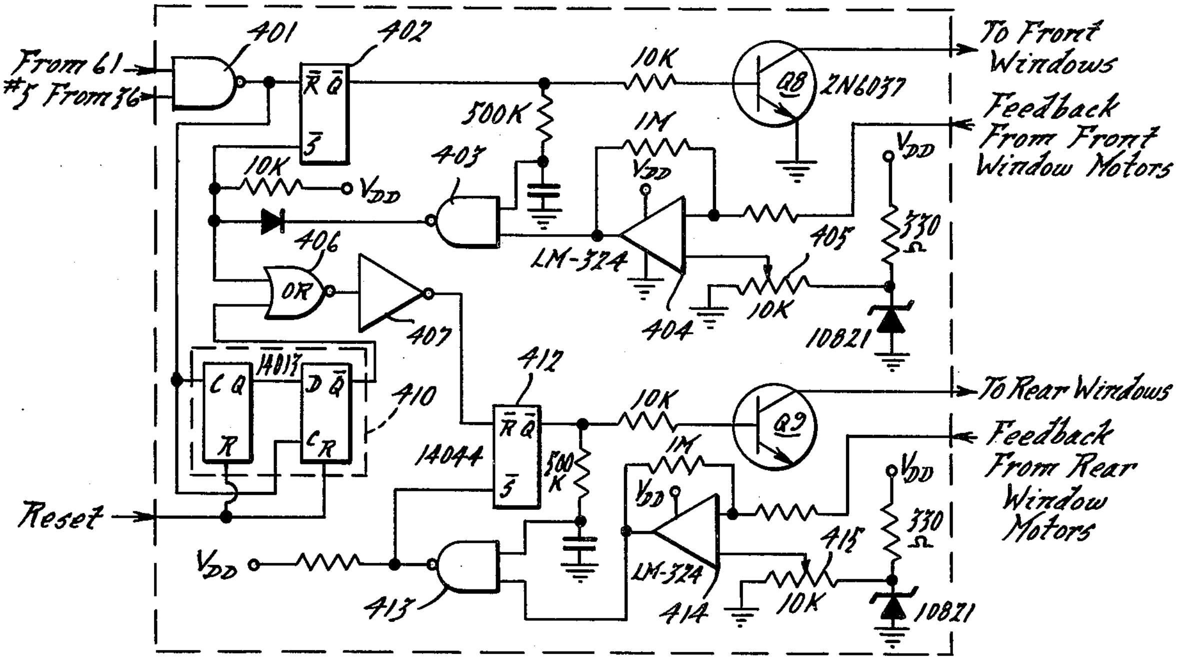

KEYLESS ENTRY SYSTEM

CROSS-REFERENCE TO RELATED APPLICATION

The present invention is related to our copending U.S. patent application Ser. No. 848,977, filed Nov. 7, 1977, entitled "Automatic Door Lock System".

BACKGROUND OF THE INVENTION

1. Field of the Invention

The present invention is directed to an anti-theft device and, more particularly, to a system which permits driver and passenger entry into a locked vehicle without the use of keys, while at the same time maintaining a high degree of security for the vehicle.

2. Description of the Prior Art

Several electrical systems have been devised for automotive vehicles, which allow persons knowledgeable of a predetermined combination to unlock a vehicle by entering that combination into an electronic switch keyboard mounted on the outside of the vehicle.

U.S. Pat. No. 3,544,804 discloses a system utilizing keyboards respectively mounted on the outside of the driver's door and on the dash. The keyboards each have numbered keys or pushbuttons which, when depressed, actuate corresponding switches. The switches, in turn, operate relay components of a register. When the proper combination is formed by sequential actuation of the keys, a lock release solenoid in the door, in the case of the door keyboard, or the starter circuit of the vehicle engine, in the case of the dash keyboard, may be respectively energized to open the door or start the vehicle. The electrical connection between particular pushbuttons of the keyboard and the sequentially actuated relays may be physically changed through the use of a plug and jack patch panel, located in the trunk of the vehicle, to effect a combination change.

U.S. Pat. No. 3,691,396 discloses an electronic combination door and ignition lock which requires insertion of a predetermined code containing repeated symbols from a keyboard unit mounted on the exterior of the vehicle in order to obtain entry to the vehicle. As above, a second keyboard is contained within the vehicle to allow energization of the ignition system of the vehicle upon the reinsertion of the same predetermined code. The system includes a hard wired logic network that gates through a predetermined sequence of keyboard entered digits and resets the system when any digit is entered, which is out of the predetermined sequence.

Both of the prior art patents, discussed above, are rigidly set up so as to cause deactivation (resetting) of the respective systems, when any error is made while entering a single predetermined combination of digits. Those patents are further limited in the number of functions that are possible to be performed while outside the vehicle and do not provide for a reprogrammable system to supplement a permanently programmed system.

SUMMARY OF THE INVENTION

The present invention is seen as an improvement over the prior art in that several functions are incorporated in a single keyless entry system for an automotive vehicle. Major improved features include a permanent preprogrammed code storage memory and a user programmable code storage memory, wherein either code may be inserted into the system to gain entry into the vehicle and enable the other functions. The other functions include the ability to unlock one or several doors of the vehicle, retract a roof-window, unlock a deck lid, lower selected side windows, reprogram a new user selected code into the programmable memory or disable the system response to the user selected code. These functions have been found to be highly desirable since they can be controlled to occur prior to entering the vehicle.

Five digit designated pushbutton keyboards on opposite vehicle doors are shown in the preferred embodiment, as the means by which all predetermined codes are manually entered into the system. A primary keyboard mounted on the left front (driver's) door is designated by the system to have continual override priority over the keyboard mounted on the right front (passenger's) door. However, each keyboard has independent operational capability to allow a user to enter correct digit codes and have the system perform the aforementioned functions.

In operation, a depression of any pushbutton on either keyboard will cause illumination of the keyboard, activation of the system, and may also cause illumination of the vehicle interior for a predetermined period of time. In this manner, the system is visible for night operation and activated to receive a multi-digit code which corresponds to either the permanent preprogrammed code or a programmed user selected code. The user then depresses a sequence of digitally designated pushbuttons and each depression commences a new time period for illumination and activation. In order to eliminate excessive battery drain, the system will deactivate and illumination will terminate if the user hesitates longer than the predetermined time period. When proper entering of either the permanent or user selected multi-digit code is made, the door, upon which the particular keyboard is mounted, will immediately unlock and allow entry to the passenger compartment of the vehicle. Subsequently, while the system remains activated during the aforementioned time period, predetermined digital pushbuttons may be depressed to unlock all the other vehicle doors, unlock, the deck lid, retract a roof-window, lower the side windows, program a new user selected code into the programmable memory, or disable the system response to the last programmed user selected code.

It is, therefore, an object of the present invention to provide an improved keyless entry system for an automotive vehicle that allows the principal user to have the option of utilizing a permanent code or a user selected code to gain entry to the vehicle.

It is another object of the present invention to provide a system by which a user may effect numerous functions, which heretofore could only be effected while inside the passenger compartment of the vehicle, to occur upon entering proper digital codes into the system from outside the vehicle.

It is a further object of the present invention to provide an anti-theft device that eliminates the use of keys to gain entry to the vehicle, while at the same time significantly increasing the number of possible code permutations in comparison to conventional key systems.

It is a further object of the present invention to provide a keyless entry system that deactivates and resets itself a predetermined amount of time after the most recent digit is entered and is activated upon the entering of any digit.

It is a still further object of the present invention to provide a keyless entry system utilizing a dual keyboard system, whereby the keyboards are mounted on opposite front doors of an automotive vehicle and one of said keyboards has operational priority over the other.

BRIEF DESCRIPTION OF THE DRAWINGS

The above stated objects and following description can be better understood by referring to the appended drawings, of which:

FIG. 6 is a detailed schematic of the AND gate logic circuit 66 shown in FIG. 2;

FIG. 7 is a detailed schematic of the AND gate logic circuit 68 shown in FIG. 2;

FIG. 8 is a detailed schematic of the AND gate logic circuit 70 shown in FIG. 2;

FIG. 9 is a detailed schematic of the AND gate logic circuit 72 shown in FIG. 2.

DESCRIPTION OF THE PREFERRED EMBODIMENT

Figure 1:
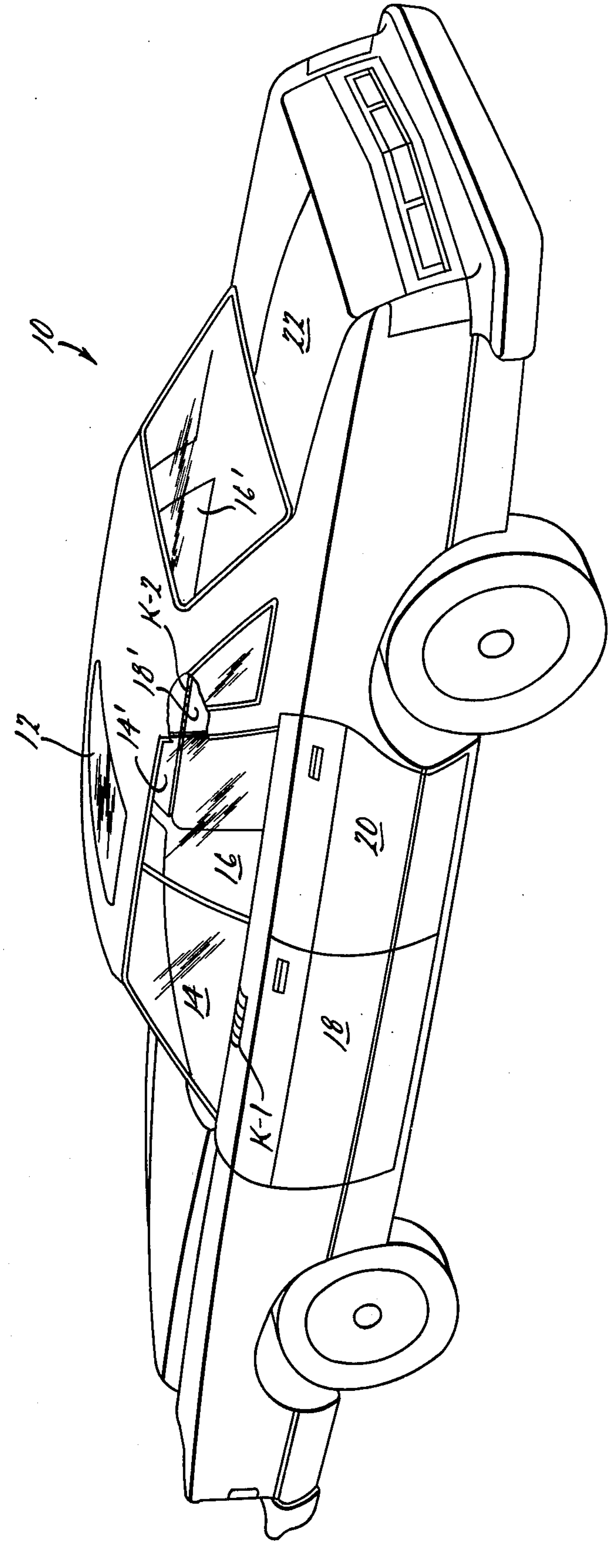
FIG. 1 illustrates an automotive vehicle incorporating the keyless entry system and specifically shows the preferred location of the digital input keyboards.

Referring to FIG. 1, a four-door sedan type automotive vehicle 10 is shown as employing the keyless entry system of the present invention, and includes a five pushbutton keyboard K-1 on the upper portion of the left front door 18, commonly referred to as the "driver's" door. The presented embodiment also provides for an additional keyboard K-2 similarly mounted on the front right door 18', commonly referred to as the "front passenger's" door. The vehicle 10 also includes an electrically releasable rear decklid 22 covering a rear storage compartment. The rear decklid 22 contains an electrically actuated unlocking mechanism, of conventional design, that is released by a switch located within the vehicle and, in this embodiment, is additionally controlled for release by the keyless entry system. The vehicle 10 is further shown as including an electrically retractable roof window 12, commonly known as a "sunroof". In addition, the vehicle 10 includes electrically powered side windows 14 and 14', mounted in respective front doors 18 and 18', and electrically powered side windows 16 and 16' mounted in respective rear doors 20 and 20'.

Of course, each of the above-mentioned electrically powered elements, including the door locks, the rear decklid 22, the roof window 12, and the electrically powered windows, are conventionally controlled by appropriate switches within the passenger compartment of the vehicle. In addition, due to the novel features of the present invention, these elements can also be controlled from outside the vehicle. The opening of the decklid 22, from the outside of the vehicle without a key, is a novel anti-theft feature since it eliminates the possibility of key cylinder "punch-out" by those attempting forced entry into the rear storage compartment. On the other hand, the control of the windows from outside the vehicle is especially desirable when one wishes to cool down the interior of the vehicle after it has been sitting for a period of time absorbing sunlight radiation. By retracting the roof window and/or lowering the side windows from the outside of the vehicle, it is possible to allow the hot air trapped inside the passenger compartment to escape before entering.

Figure 2A:
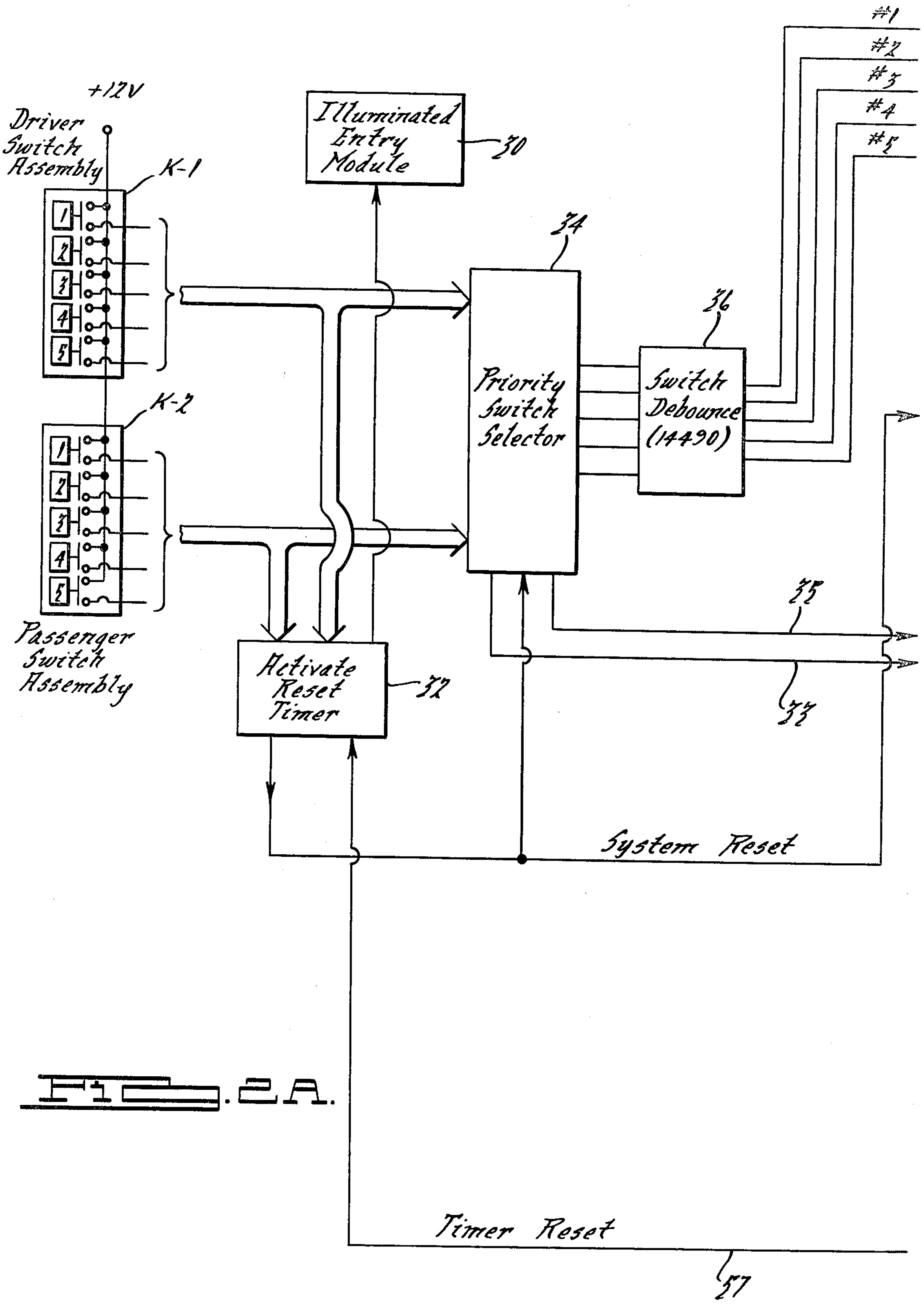
FIGS. 2A and 2B form an overall block diagram illustrating the various logic functions of the system.
Figure 2B:
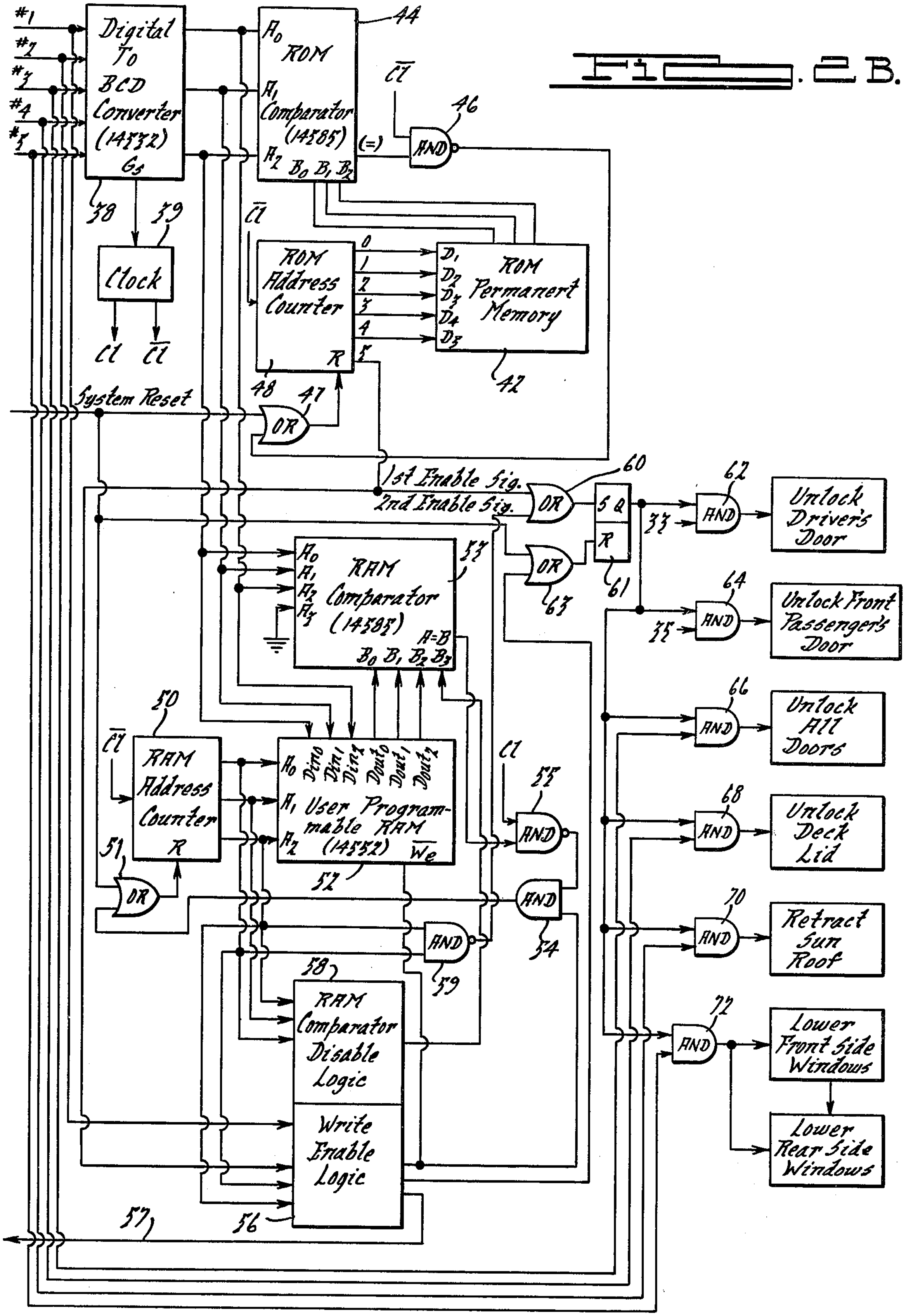
Figure 3:
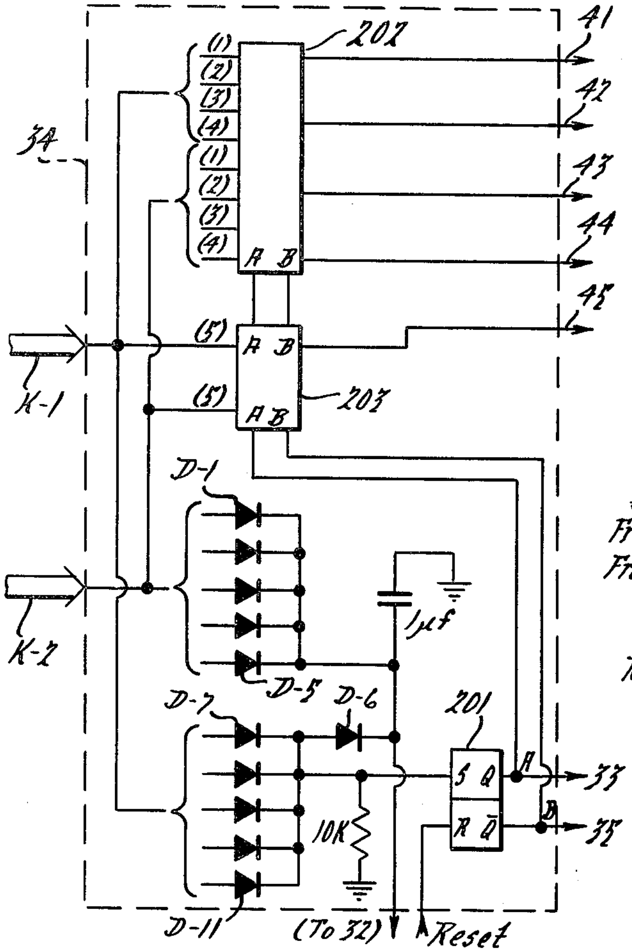
FIG. 3 is a detailed schematic of the priority switch selector shown in FIG. 2.

Referring to FIG. 2, the principle of operation is shown. A driver door switch assembly K-1 and a similar passenger door switch assembly K-2 are each shown as comprising five pushbutton switches respectively designated with digital values of "1", "2", "3", "4" and "5". Whenever any one of the pushbuttons on either assembly is depressed, that event is detected by an activate/reset timer 32 through an eleven diode array (D-1, . . . D-11) shown in FIG. 3.

Figure 4:
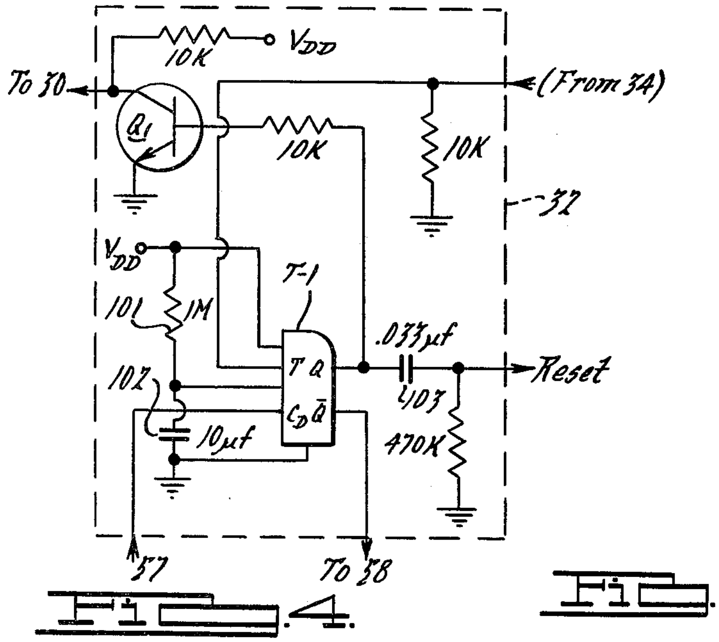
FIG. 4 is a detailed schematic of the activate/reset timer shown in FIG. 2.

The activate/reset timer 32, shown in detail in FIG. 4, is used to generate an activate signal to an illuminated entry module 30 in response to any depressed pushbutton. The illuminated entry module 30 is a conventional relay circuit which, when activated, energizes selected lamps, such as those in the passenger compartment of the vehicle and, in this case, lamps which illuminate the keyboards. In this invention, illumination of the keyboard is a convenience feature which allows the user to operate the keyboard in darkness and which informs the user that the system is activated to receive coded inputs.

The activate/reset timer 32 provides an output signal to the illuminated entry module 30 through a transistor T-1 for a period of time which is generally selected to be in the range of approximately five to twenty seconds. Selection of values for the resistor 101 and capacitor 102 determine the period of time. In this case, values of 1 M ohm and 10 μf were respectively selected to give a time period of approximately 16.5 seconds. The timer circuit T-1 is a monostable multi-vibrator, such as that commercially designated as 14528. As each subsequent pushbutton is depressed, the activate/reset timer 32 continues to output an activating signal to the illuminated entry module 30, since each subsequently depressed pushbutton restarts the time period. When the aforementioned time period elapses following the last depression of a pushbutton, the negative going signal from the timer T-1 is output through capacitor 103 as a SYSTEM RESET signal. The SYSTEM RESET signal is used to reset the various components of the system and to specifically inhibit comparators 44 and 46, which are more fully described below.

The outputs of the switch assemblies K-1 and K-2 are directly fed to a priority switch selector 34, for gating. The priority switch selector 34 is shown in detail in FIG. 3 and referred to in the following description.

In this invention, primary priority of control operation is assigned to the driver switch assembly K-1 and secondary priority is assigned to the passenger switch assembly K-2. To achieve selection, the signal inputs from the switch assembly K-1 are commonly connected through diodes D-7 through D-11 to set a flip-flop 201 and produce a Q output signal whenever one of the pushbuttons of the assembly K-1 is depressed. The setting of the flip-flop 201 enables the "A" channel selector inputs of two channel data selectors 202 and 203. The channel selectors 202 and 203 are commercially designated as 14519 and are connected to gate through the five digital signals from the switch assembly K-1 (A channel), whenever any one of the pushbuttons on the assembly K-1 is depressed. Otherwise, the flip-flop 201 is in its reset condition and the $\overline{Q}$ output signal enables the "B" channel selector inputs of the two channel data selectors 202 and 203. In this case, the digital signals from the switch assembly K-2 (B channel) are gated through the channel selectors 202 and 203, when the flip-flop 201 is reset. The signals from the keyboard of the selected channel are correspondingly gated through on output lines 41, 42, 43, 44, and 45 as respective digital value signals.

In addition to selecting and gating a channel, the priority switch selector 34 outputs channel designating signals on lines 33 and 35, which respectively correspond to the selected A and B channels. The output signals on lines 33 and 35 respectively enable corresponding AND gate logic circuitry 62 or 64 which controls unlocking of the door corresponding to the keyboard switch assembly selected to have control.

In operation, the inputs to the switch assembly K-2 are gated through the priority switch selector 34 until such time as a pushbutton is depressed on the switch assembly K-1. At that time, the gating of the signals from the switch assembly K-2 is disabled in favor of subsequent signals coming from the switch assembly K-1 within the predetermined time period. In this configuration, the user may enter the proper codes into the driver switch assembly K-1 without interference from someone else indiscriminately depressing various pushbuttons on the switch assembly K-2.

In the alternative, of course, the passenger switch assembly K-2 may be deleted in favor of only one switch assembly K-1 mounted on the driver's door. In such an alternative embodiment, the priority switch selector 34 would be deleted.

The gated digital value signals on lines 41, 42, 43, 44, and 45 are connected to a switch debounce circuit 36. In this embodiment, a commercially designated module 14490 is used. The switch bounce circuit is used for the elimination of extraneous voltage level changes that occasionally result due to the interfacing of the electronics with the mechanical contacts of the keyboards. The circuit takes an input signal from a bouncing contact and generates a clean digital signal. This eliminates the possibility of the circuit seeing switch chatter as multiple pulses. The output of the switch debounce circuit 36 is connected to a digital-to-BCD converter 38, where the digital value signals are converted to binary code and output on three lines 51, 52, and 54.

The digital-to-BCD converter selected for this embodiment is commercially designated as 14532 and has a $G_s$ output for every signal input. The $G_s$ output is used to trigger clocking signals in a conventional clocking generator circuit 39. The output of the clocking generator circuit 39 contains both cl and $\overline{cl}$ signals. The BCD output from the converter 38 is connected to a ROM comparator 44, a RAM comparator 53, and a user programmable RAM 52.

Figure 10:
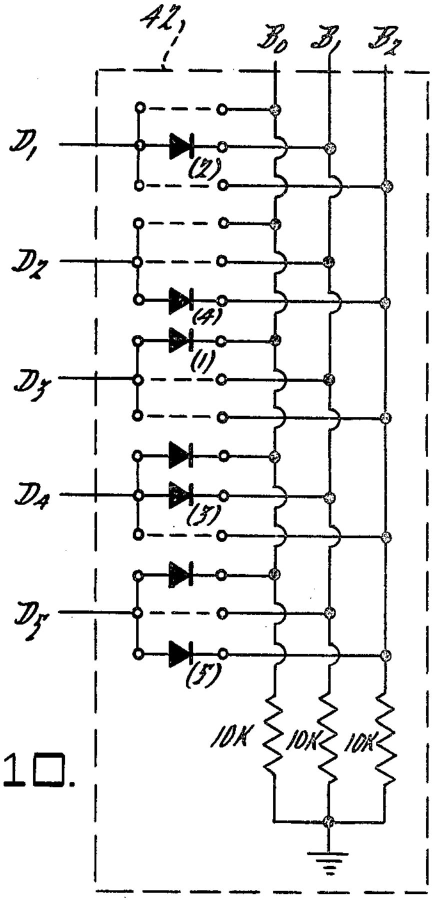
FIG. 10 is a detailed schematic of the ROM permanent memory 42 shown in FIG. 2.

A ROM address counter 48 is initially set to a zero count (first address) and its output is connected to address a ROM permanent memory 42. The permanent memory 42 is detailed in FIG. 10 as being wired (preprogrammed) for the sequentially entered code of 2-4-1-3-5. It should be understood that the diodes shown in the permanent ROM memory 42 correspond to one wiring arrangement of 3,125 possible arrangements and correspond to one digital code 3,125 possible digital codes. Of course, a greater number of codes are possible if the number of data lines and corresponding number of pushbutton keys are expanded.

When the ROM address counter 48 is at a zero count, the corresponding first address "$D_1$" to the ROM 42 causes a 0-1-0 (2) to appear at the corresponding $B_0$-$B_1$-$B_2$ output line and input to the ROM comparator 44. Each BCD output from the converter 38, corresponding to a digital value signal, is compared in the ROM comparator 44 with the addressed contents of the memory 42. In this case, the ROM comparator 44 is commercially designated as 14585. Therefore, when the ROM address counter 48 is at a zero count and when a digital value signal corresponding to the #2 pushbutton is entered, the ROM comparator 44 will output a "1" on its A=B output terminal. This output signal is then input to a NAND gate 46 which, through an OR gate 47, inhibits the resetting to the ROM address counter 48. The inhibiting of the reset allows the counter 48 to be advanced by one count upon the input of the next $\overline{cl}$ signal. Therefore, the second address causes a 0-0-1 (4) to appear at the corresponding $B_0$-$B_1$-$B_2$ input to the comparator 44.

As each BCD signal from the converter 38 is compared in the comparator 44 and found to be equal to the addressed contents of the memory 42, the ROM address counter 48 is advanced. After the ROM address counter 48 has advanced five times (sixth address), a FIRST ENABLE signal is output from the counter 48 and is gated through an OR gate logic 60 to a latch 61 and provides a FUNCTION ENABLING signal to AND gate logic circuits 62, 64, 66, 68, 70, and 72.

The RAM comparator 53 is also commercially designated as 14585 and operates in parallel with the ROM comparator 44 to simultaneously compare each digital value signal as converted by the BCD converter 38 with the read-out contents of the user programmable RAM 52. A RAM address counter 50 operates in a manner similar to the ROM address counter 48 to sequentially advance to its next address whenever an A=B output signal is generated by the RAM comparator 53.

A type 14552 RAM was selected for the user programmable RAM 52. Assuming it has been programmed, the RAM 52 is sequentially addressed for read-out by the BCD output of the RAM address counter 50. The data read-out at terminals $D_{out0}$-$D_{out1}$-$D_{out2}$, from the user programmable RAM 52 is input to the RAM comparator 53 at corresponding input terminals $B_0$-$B_1$-$B_2$. The data read-out from the user programmable RAM 52 is then compared with the converted digital value signals input to terminals $A_0$-$A_1$-$A_2$. A fourth data input terminal $A_3$ is compared with a corresponding data input terminal $B_3$. In this configuration, the data input terminal $A_3$ is grounded and the data input terminal $B_3$ is normally held to zero by a RAM comparator disable logic 58. Briefly, the RAM comparator disable logic 58 functions to supply a "1" to the data input terminal $B_3$ of the RAM comparator 53 whenever the user operates the system to disable the optional user programmable code feature of the system in favor of exclusive permanent code operation. The disable logic 58 is explained in greater detail below.

Whenever the data inputs to the RAM comparator 53, from the user programmable RAM 52, are found to respectively correspond to the data inputs from the converted digital value signals, the RAM comparator 53 outputs an A=B signal to a NAND gate 55. The occurrence of the A=B signal causes a "0" output therefrom which is connected to the input of an AND gate 54. A second input to AND gate 54 is the WRITE ENABLE-(not) signal from logic 56. Therefore, when the RAM 52 is in the READ mode, a "1" signal from the NAND gate 55 is gated through the enabled AND gate 54 to effect resetting of the RAM address counter 50 through OR gate 51, if no A=B signal is output from the RAM comparator 53 during a $\overline{cl}$ pulse. After the RAM address counter 50 has advanced five times, to its sixth address, a SECOND ENABLE signal is responsively output from an AND gate 59 to the OR gate 60, mentioned above. The input to the AND gate 59 corresponds to the $A_0$ and $A_2$ address output from the RAM address counter 50. Since these addresses are in BCD, a simultaneous appearance of "1", at both the $A_0$ and $A_2$ address outputs, corresponds to the sixth address of the RAM address counter 50. This signifies that the five preceeding digital value signals input to the RAM comparator 53 have been found to positively match the corresponding five data values read-out from the user programmable RAM 52. The occurrence of either the FIRST ENABLE signal or the SECOND ENABLE signal to the OR gate 60 causes a setting of the latch 61, which produces the FUNCTION ENABLING signal to enable occurrence of the subsequent functions in response to appropriate commands.

However, one of the subsequent functions is enabled exclusively by the FIRST ENABLE signal. That function allows the user to program the user programmable RAM 52 with a new user selected code having five digital values. This is achieved by entering the permanent code into a selected keyboard to cause the ROM address counter 48 to produce the FIRST ENABLE signal. The FIRST ENABLE signal is connected to the input of a write enable logic circuit 56, which is shown in detail in FIG. 5. The FIRST ENABLE signal from the ROM address counter 48 is used to set a latch 84, which enables an AND gate 82. In order to produce a WRITE ENABLE-(not) signal as an output of the write enable logic circuit 56, the user must depress the #1 button on a selected keyboard following the insertion of the permanent code. If another pushbutton is depressed immediately following the insertion of the permanent code, a correspondingly designated function occurs, but the WRITE ENABLE-(not) signal is not generated until the #1 button is depressed.

Providing the #1 digital value signal is generated and applied to the enabled AND gate 82 a latch 86 will be set and thereby generate a WRITE ENABLE-(not) signal, to the WRITE ENABLE terminal $\overline{W_e}$ on the user programmable RAM 52, through an inverter 87. The output signal from the latch 86 is also fed to AND gate 80. Other inputs to AND gate 80 are connected to receive addresses $A_0$ and $A_2$ from the RAM address counter 50 to indicate a fifth advance (sixth address) of the RAM address counter 50. Therefore, when a new user selected code is being programmed into the user programmable RAM 52, following the insertion of the permanent code and the subsequently entered #1, the WRITE ENABLE-(not) signal places the user programmable RAM 52 in the WRITE mode so that the next five sequentially entered digits will be correspondingly stored in the user programmable RAM 52.

The WRITE ENABLE-(not) signal fromthe write enable logic 56 also is connected as the second of two inputs to disable an AND gate 54 and thereby prevent the resetting of the RAM address counter 50 during the WRITE mode of the user programmable RAM 52, and to enable the gate 54 when the user programmable RAM 52 is in the READ mode.

Following the writing-in of the fifth digit of a new user selected code, the AND gate 80 outputs a signal along line 57 to immediately reset the activate/reset timer 32. A SYSTEM RESET signal is then generaated by the activate/reset timer 32, which resets and deactivates the entire system. This immediate resetting of the system, following the writing-in of the new user selected code, allows the user to immediately reenter the new code and check to see that it is correct and operational.

If, on the other hand, the user wishes to inhibit the user selected code portion of the system, he merely enters the permanent code followed by the #1 and waits for the activate/reset timer 32 to reset the system. That sequence prevents the RAM comparator 53 from producing A=B signals until a new user selected code is subsequently programmed into the system, since the $B_3$ input to the comparator 53 is latched to a "1" level by the RAM comparator disable logic circuit 58.

Figure 5:
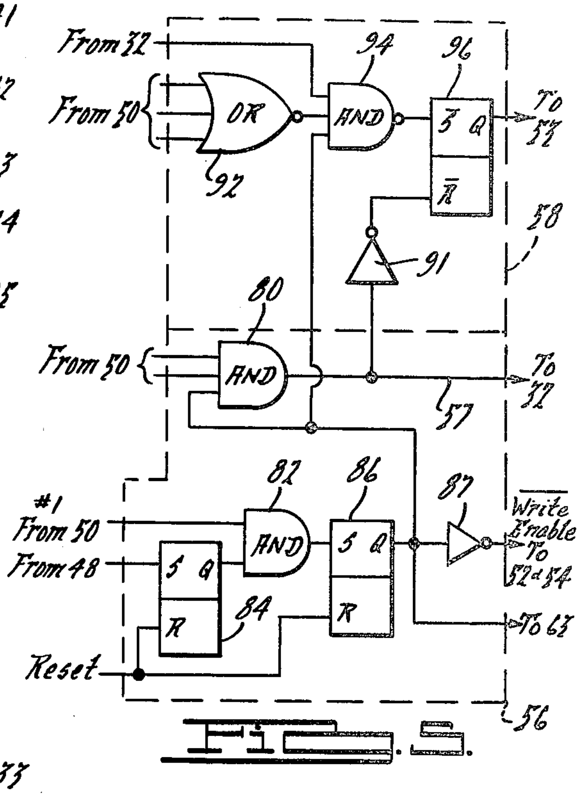
FIG. 5 is a detailed schematic of both the RAM comparator disable logic and write enable logic shown in FIG. 2.

The RAM comparator disable logic 58, shown in detal in FIG. 5, incorporates a NOR gate 92, which receives the three outputs of the RAM address counter 50 and generates a "1" when the RAM address counter 50 is at its zero count level (first address). The output of the NOR gate 92 is connected to one input of a NAND gate 94. A second input to the NAND gate 94 is connected to receive the output signal from latch 86, while a third input is received from the $\overline{Q}$ output of timer T-1. The output of the NAND gate 94 is connected to the $\overline{S}$ terminal of a latch 96 to set the latch 96 when the latch 86 is set and no subsequent digits are entered into the system. The output of the latch 96 is connected to the $B_3$ terminal of the RAM comparator 53. In this configuration, the latch 96 will be set to inhibit a true comparison in the RAM comparator 53 when the user fails to enter a complete five-digit new user selected code following the entry of the permanent code and the digit "1". The latch 96 is reset to produce a "0" output to $B_3$ of the RAM comparator 53 when a new user selected code is written into the user programmable RAM 52 by the inverted output of AND gate 80.

Other functions are now described which can be commanded by depressing predetermined pushbuttons following the generation of either the FIRST ENABLING signal or the SECOND ENABLING signal.

An AND gate logic circuit 66 is shown in FIGS. 2 and 6. The AND gate logic circuit 66 comprises a NAND gate 101 which receives the FUNCTION ENABLING signal from latch 61 and the #2 digital value signal from the switch debounce circuit 36. The output of the NAND gate 101 is connected to a latch 102, which has its output connected to activate a driving transistor Q6. The collector of the transistor Q6 is connected to a conventional electrically activated relay (not shown) for unlocking all the doors of the vehicle.

An AND gate logic circuit 68 is shown in FIGS. 2 and 7, which gates through a #3 digital value signal from the switch debounce circuit 36 when enabled by the FUNCTION ENABLING signal from latch 61 to effect unlocking of the decklid by activating an electrically energizable decklid lock relay (not shown). The AND gate logic circuit 68 comprises a NAND gate 201, a latch 202, and a transistor Q5. The AND gate logic circuit 68 is substantially identical to the AND gate logic circuit 66 shown in FIGS. 2 and 6.

An AND gate logic circuit 70 is shown in FIGS. 2 and 8, wherein a digital value signal #4 is gated by the FUNCTION ENABLING signal from latch 61 to energize a motor of a retractable sunroof. In addition to identical AND gate logic circuitry as that shown in FIGS. 6 and 7, the AND gate logic circuit 70 comprises a feedback circuit, wherein the sunroof motor is monitored so that when the sunroof motor enters a stalled condition, that condition will be sensed and the sunroof motor will then be deenergized. The AND gate logic circuit 70 comprises a NAND gate 301 which, upon receiving a FUNCTION ENABLING signal from latch 61 and a #4 digital value signal, sets a latch 302 that in turn energizes transistor Q7. The collector of the transistor Q7 is connected to the sunroof motor to cause retraction of the sunroof. In the feedback circuit, a comparator 304 is connected to monitor the voltage across the sunroof motor. When the sunroof motor becomes stallerd (fully retracted), the voltage level will change and that change will be compared against a preset level at potentiometer 305, which is connected to a second input of the comparator 304. A sensed difference between the voltage inputs to the comparator 304 is gated through NAND gate 303 to reset the latch 302.

An AND gate logic circuit 72 is shown in FIGS. 2 and 9 and functions to gate a first #5 digital value signal through an enabled NAND gate 401 to set a latch 402 to thereby energize a drive transistor Q8 and effect lowering of the front side windows of the vehicle. A feedback circuit, similar to that shown in FIG. 8, is included to reset the latch 402 and terminate drive of the front window motors when they are fully lowered and the motors reach stalled condition. The feedback circuit comprises potentiometer 405, a comparator 404, and a NAND gate 403, which are wired in substantially the same manner s shown in FIG. 8. In addition, the AND gate logic circuit 72 functions to store a second #5 digital value signal which is entered into the keyboard prior to the generation of the SYSTEM RESET signal by the activate/reset timer 32. This is necessitated by the fact that the activate/reset timer 32 may have a time-out period which is less than the time it takes to lower the front side windows. Therefore, the first inserted #5 digital value signal causes the front side windows to be lowered and the second entered #5 digital value signal is stored to effect lowering of the rear side windows following completion of the lowering of the front side windows. This is accomplished by a divider circuit 410, which is a dual type D flip-flop 14013. The divider 410 is connected to receive the output of the NAND gate 401. The first #5 digital value signal gated through the NAND gate 401 is clocked into the divider 410 and the second #5 digital value signal gated through the NAND gate 401 causes the divider 410 to output a "0" signal to a NOR gate 406. A second input terminal of the NOR gate 406 is connected to receive the output of NAND gate 403 in the feedback line from the front window motors. Therefore, when both the input terminals to NOR gate 406 are "0" the NOR gate 406 produces a "1" which is inverted by an inverter 407 to set a latch 412. The set latch 412 energizes a drive transistor Q9, which is connected to a relay for energizing the motors of the side rear windows and cause the lowering thereof. A feedback circuit comprising a potentiometer 415, a comparator 414, and a NAND gate 413 are connected in a manner, as discussed in the above-mentioned feedback circuits, to reset the latch 412 when the rear window motors are fully lowered.

It should be noted that in both the AND gate logic circuits 70 and 72, the functions continue even though the SYSTEM RESET signal from the activate/reset timer 32 may occur. However, due to the feedback circuits the AND gate logic circuits 70 and 72 are self-resetting, independent of the SYSTEM RESET signal.

It will be apparent that many modifications and variations may be effected without departing from the scope of the novel concept of this invention. Therefore, it is intended by the appended claims to cover all such modifications and variations which fail within the true spirit and scope of the invention.

What is claimed is:

1. A keyless entry system for use in an automotive vehicle comprising:

means for entering at least one multi-digit code into said system and generating representative electrical signals;

means for permanently storing a predetermined code representing n sequential digits, where n is a predetermined number;

first means for addressing said permanent storing means in response to each individually entered digit;

means for storing a user programmed code representing n sequential digits;

second means for addressing said user code storing means in response to each individually entered digit;

means for sequentially comparing each individually digit entered into said system with the read out contents of said permanent storing means and with the read out contents of said user code storing means, wherein said comparing means is connected to respective first and second addressing means to advance a corresponding addressing means to its next address whenever a comparison indicates equality and to reset a corresponding addressing means to its initial address whenever a comparison indicates inequality;

said first and second addressing means respectively generate corresponding first and second enabling signals when sequentially advanced to an n+1th address; and means for unlocking a door of said vehicle in response to either of said first and second enabling signals.

2. A keyless entry system as in claim 1, further including:

means for activating said system by generating an activating signal for at least a predetermined amount of time following the entry of any digit into said entering means, said activating means also resets said first and second addressing means, to prevent generation of said corresponding enabling signals when said predetermined amount of time lapses following the last entry of any digit into said entering means.

3. A keyless entry system as in claim 2, wherein said entering means includes a first manually activated keyboard, mounted external to said vehicle, having a plurality of switches representing predetermined digit values and being electrically connected to said comparing means.

4. A keyless entry system as in claim 3, wherein said entering means generates digit value signals corresponding to respectively activated switches and said activating means responds to any of said digit value signals.

5. A keyless entry system as in claim 4, wherein said entering means includes first and second manually activated keyboards mounted external to said vehicle; and said system further includes means for gating corresponding digit value signals from said second keyboard when said switches thereon are activated and for interrupting said digit value signals from said second keyboard in response to any of said digit value signals from said first activated keyboard, thereby designating said first keyboard with control priority over said second keyboard.

6. The keyless entry system as in claim 4, further including an AND gate logic circuit exclusively enabled by said first enabling signal to gate a contemporaneously generated predetermined digit value signal from a corresponding designated activated switch of said entering means and the output of said logic circuit being connected to enable a "write" mode of said user programmable storing means upon the occurrence of said gated predetermined digit value signal.

7. A keyless entry system as in claim 2, wherein said system further includes means for illuminating said entering means in response to said activating signal.

8. A keyless entry system as in claim 1, wherein said automotive vehicle has a plurality of doors with electrically controlled locks, and said system includes means for unlocking all the other doors of said vehicle in response to either of said first and second enabling signals and the contemporaneous entering of a predetermined digit into said entering means.

9. A keyless entry system as in claim 1, wherein said vehicle has a deck lid, and said system further includes means for unlocking said deck lid in response to either of said first and second enabling signals and the contemporaneous entering of a predetermined digit into said entering means.

10. A keyless entry system as in claim 1, wherein said vehicle includes an electrically retractable roof window, and said system includes means for fully retracting said roof window in response to either of said first and second enabling signals and the contemporaneous entering of a predetermined digit into said entering means.

11. A keyless entry system as in claim 1, wherein said vehicle includes electrically powered windows, and said system includes means for opening said windows in response to either of said first and second enabling signals and the contemporaneous entering of a predetermined digit into said entering means.

12. A keyless entry system as in claim 1, wherein said vehicle includes first and second sets of electrically controllable windows; said system includes means for lowering said first set of windows in response to either of said first and second enabling signals and the contemporaneous entering of a predetermined digit into said entering means; and said system also includes means for lowering said second set of windows in response to either of said first and second enabling signals and the contemporaneous second entering of said last mentioned predetermined digit into said entering means.

13. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and wherein said system further includes:

a secondary door mounted keyboard for the manual entering of multi-digit codes and for generating corresponding secondary digital value signals; and a priority control circuit for normally gating said secondary digital value signals to said decoder and for preventing said gating of said secondary digital value signals when said primary digital value signals are generated.

14. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and further including a timing circuit for generating an activation signal over a predetermined period of time in response to the sequentially ordered entering of any digit into said keyboard and for generating a reset signal, supplied to said first and second comparator circuits, at said period of time termination, wherein said timing circuit continues to generate said activation signal for said period of time following the entry of the last digit to said keyboard.

15. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and wherein said operator selected binary code is stored in said programmable memory by a program method including the steps of:

entering a multi-digit code, corresponding to the predetermined code stored in said permanent memory, into said keyboard;

manually entering a predetermined digit into said keyboard to place said programmable memory in a "write" mode; and manually entering a selected code, of n sequentially arranged digits, into said keyboard.

16. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and wherein said system includes an AND gate logic circuit exclusively enabled by said first enabling signal to gate a contemporaneously generated predetermined digit value signal from a corresponding designated key of said keyboard and the output of said logic circuit being connected to enable the "write" mode of said programmable memory upon the occurrence of said gated predetermined digit value signal.

17. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and wherein said automotive vehicle has a plurality of doors with electrically controlled locks, and said system includes means for unlocking all the other doors of said vehicle in response to one of said first and second enabling signals and the contemporaneous entering of a predetermined digit into said keyboard.

18. A keyless entry system for an automotive vehicle comprising:

a primary door mounted keyboard for the manual entering of multi-digit codes and for generating corresponding primary digital value signals;

a decoder circuit for converting said digital value signals to corresponding binary coded signals;

a permanent memory having a predetermined binary code stored therein corresponding to n digits, where n is defined as a predetermined number;

a programmable memory electrically connected to store an operator selected binary code corresponding to n digits;

a first comparator circuit electrically connected to compare said binary coded signals from said decoder with said binary code stored in said permanent memory to generate a first enabling signal when they are sequentially the same;

a second comparator circuit electrically connected to compare said binary coded signals from said decoder with said binary code stored in said programmable memory to generate a second enabling signal when they are sequentially the same;

an unlocking circuit which electrically unlocks at least one of the doors of said automotive vehicle in response to one of said first and second enabling signals; and wherein said vehicle has a deck lid, and said system further includes means for unlocking said deck lid in response to one of said first and second enabling signals and the contemporaneous entering of a predetermined digit into said keyboard.

19. A keyless entry system for an automotive vehicle comprising:
   a primary door mounted keyboard for the manual entering of multi-digit codes and for generating corresponding primary digital value signals;
   a decoder circuit for converting said digital value signals to corresponding binary coded signals;
   a permanent memory having a predetermined binary code stored therein corresponding to n digits, where n is defined as a predetermined number;
   a programmable memory electrically connected to store an operator selected binary code corresponding to n digits;
   a first comparator circuit electrically connected to compare said binary coded signals from said decoder with said binary code stored in said permanent memory to generate a first enabling signal when they are sequentially the same;
   a second comparator circuit electrically connected to compare said binary coded signals from said decoder with said binary code stored in said programmable memory to generate a second enabling signal when they are sequentially the same;
   an unlocking circuit which electrically unlocks at least one of the doors of said automotive vehicle in response to one of said first and second enabling signals; and wherein said vehicle includes a retractable roof window, and said system includes means for sully retracting said roof window in response to one of said first and second enabling signals and the contemporaneous entering of a predetermined digit into said keyboard.

20. A keyless entry system for an automotive vehicle comprising:
   a primary door mounted keyboard for the manual entering of multi-digit codes and for generating corresponding primary digital value signals;
   a decoder circuit for converting said digital value signals to corresponding binary coded signals;
   a permanent memory having a predetermined binary code stored therein corresponding to n digits, where n is defined as a predetermined number;
   a programmable memory electrically connected to store an operator selected binary code corresponding to n digits;
   a first comparator circuit electrically connected to compare said binary coded signals from said decoder with said binary code stored in said permanent memory to generate a first enabling signal when they are sequentially the same;
   a second comparator circuit electrically connected to compare said binary coded signals from said decoder with said binary code stored in said programmable memory to generate a second enabling signal when they are sequentially the same;
   an unlocking circuit which electrically unlocks at least one of the doors of said automotive vehicle in response to one of said first and second enabling signals; and wherein said vehicle includes electrically powered windows, and said system includes means for opening said windows in response to one of said first and second enabling signals and the contemporaneous entering of a predetermined digit into said keyboard.

* * * * *

UNITED STATES PATENT AND TRADEMARK OFFICE
CERTIFICATE OF CORRECTION

PATENT NO. : 4,205,325

DATED : May 27, 1980

INVENTOR(S) : Juan C. Haygood et al

It is certified that error appears in the above-identified patent and that said Letters Patent are hereby corrected as shown below:

Column 5, line 39, "bounce" is changed to --debounce--.

Column 5, line 67, --of-- is inserted after "code".

Column 7, line 64, "fromthe" is changed to --from the--.

Column 8, line 6, "generaated" is changed to --generated--.

Column 9, line 19, "stallerd" is changed to --stalled--.

Column 15, line 30, "sully" is changed to --fully--.

UNITED STATES PATENT AND TRADEMARK OFFICE

CERTIFICATE OF CORRECTION

PATENT NO. : 4,205,325

DATED : May 27, 1980

INVENTOR(S) : Juan C. Haygood et al

It is certified that error appears in the above-identified patent and that said Letters Patent are hereby corrected as shown below:

Column 10, line 31 (Claim 1), "individually" is changed to --individual--.

Column 12, line 65 (Claim 14) "last" is changed to --most recent--.

Column 13, line 27 (Claim 15), --sequentially ordered-- is inserted between "the" and "steps".

Signed and Sealed this

*Twelfth* Day of *August 1980*

[SEAL]

*Attest:*

SIDNEY A. DIAMOND

*Attesting Officer* *Commissioner of Patents and Trademarks*